(12) United States Patent
Wang et al.

(10) Patent No.: US 9,331,956 B2
(45) Date of Patent: May 3, 2016

(54) PROCESSING METHOD FOR STATEFUL PATH COMPUTATION ELEMENT AND STATEFUL PATH COMPUTATION ELEMENT

(75) Inventors: Xuerong Wang, Shenzhen (CN); Yuanlin Bao, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 398 days.

(21) Appl. No.: 13/884,264

(22) PCT Filed: Jan. 20, 2011

(86) PCT No.: PCT/CN2011/070440
§ 371 (c)(1),
(2), (4) Date: May 8, 2013

(87) PCT Pub. No.: WO2012/062050
PCT Pub. Date: May 18, 2012

(65) Prior Publication Data
US 2013/0227146 A1    Aug. 29, 2013

(30) Foreign Application Priority Data

Nov. 9, 2010    (CN) .......................... 2010 1 0538250

(51) Int. Cl.
*H04L 12/70* (2013.01)
*H04L 12/913* (2013.01)
*H04L 12/715* (2013.01)

(52) U.S. Cl.
CPC .............. *H04L 47/724* (2013.01); *H04L 45/04* (2013.01)

(58) Field of Classification Search
CPC . H04L 12/5695; H04L 45/28; H04L 41/0672; H04L 41/12
USPC ........................................................ 709/226
See application file for complete search history.

(56) References Cited

U.S. PATENT DOCUMENTS

| | | | |
|---|---|---|---|
| 2006/0039391 A1* | 2/2006 | Vasseur et al. ................ | 370/409 |
| 2006/0079249 A1* | 4/2006 | Shim ........................... | 455/456.1 |
| 2007/0019558 A1* | 1/2007 | Vasseur et al. ................ | 370/248 |
| 2009/0228604 A1* | 9/2009 | Miyazaki ...................... | 709/238 |
| 2011/0242995 A1* | 10/2011 | Zhang et al. .................. | 370/252 |
| 2013/0007266 A1* | 1/2013 | Jocha et al. ................... | 709/224 |

FOREIGN PATENT DOCUMENTS

WO    2007011927    1/2007

OTHER PUBLICATIONS

Network Working Group, Stateful PCE. ZTE Corporation, Oct. 25, 2010.

* cited by examiner

*Primary Examiner* — Hee Soo Kim
*Assistant Examiner* — Elizabeth Kassa
(74) *Attorney, Agent, or Firm* — Porter Wright Morris & Arthur LLP

(57) ABSTRACT

The disclosure discloses a processing method for a stateful Path Computation Element (PCE) and a stateful PCE. The method includes: the stateful PCE completes path computation of the stateful PCE, and reserves or locks resources needed by a computed path; the stateful PCE receives a first notification message, wherein the first notification message is used for notifying the stateful PCE of a path which is unsuccessfully established during a Resource Reservation Protocol (RSVP) signalling procedure or a path which is successfully deleted during an RSVP signalling procedure; and the stateful PCE releases resources needed by the path notified by the first notification message. The disclosure improves the real-time property and accuracy of the resource information which the stateful PCE is aware of, and the accuracy of the path computation of the PCE, so as to avoid resource conflict.

16 Claims, 6 Drawing Sheets

PROCESSING METHOD FOR STATEFUL PATH COMPUTATION ELEMENT AND STATEFUL PATH COMPUTATION ELEMENT

TECHNICAL FIELD

The disclosure relates to the field of communications, in particular to a processing method for a stateful Path Computation Element (PCE) and a stateful PCE.

BACKGROUND

A PCE working group in an Internet Engineering Task Force (IETF) provides a PCE, in order to solve the problems of multi-domain path computation and complex constraint path of a Multi-Protocol Label Switching/Generalized Multi-Protocol Label Switching (MPLS/GMPLS) network. The PCE is a functional entity specialized in path computation in a network and is configured to compute one optimal path meeting a constraint condition according to a request of a Path Computation Client (PCC) based on the known network topology and constrain condition. The PCE can be located at any position of a network. The PCE can be integrated inside a network device, such as a Label Switch Router (LSR) or an operational support system, and can also be an independent device. A special PCE computation protocol (PCE Communication Protocol, abbreviated as PCEP) can be adopted to conduct communications between a PCC and a PCE and between two PCEs, for example, submitting a path computation request and acquiring a path computation result. The PCC can be an LSR or a Network Management System (NMS) in the MPLS/GMPLS network.

In the PCEP, the format of a notification message for the PCE (called a PCEP notification message, hereafter referred to as a PCNtf message) is as follows.

```
<PCNtf Message> ::= <Common Header>
                    <notify-list>
<notify-list> ::= <notify> [<notify-list>]
<notify> ::= [<request-id-list>]
             <notification-list>
<request-id-list> ::= <RP>[<request-id-list>]
<notification-list> ::= <NOTIFICATION>[<notification-list>]
```

The Request Parameter (RP) object contains a request number, with the format shown in FIG. 1. The format of the NOTIFICATION object is as shown in FIG. 2, in which a flag bit, a Notification-type, a notification value and an optional Type Length Value (TLV) are specified, wherein there are two Notification-types:

Notification-type=1: cancel a path computation request;
Notification-type=2: overloaded PCE.

According to the definition of the RFC 4655 of the IETF standard, the PCE can be classified as a stateful PCE and a stateless PCE. The stateless PCE performs path computation only using information in a Traffic Engineering Database (TED), while the stateful PCE performs path computation not only based on topological information in the TED but also using information of known paths and occupied resources in the network. Therefore, the stateful PCE can solve the difficult problem of the stateless PCE well, which is described in the following scenarios in detail.

Scenario 1: a resource conflict is caused by batch establishment.

Scenario 1.1: when a failure occurs in the network, multiple Label Switched Paths (LSPs) need to be restored at the same time in a single domain and multiple domains.

Under the architecture of the PCE, a lot of LSP computation requests are received by the PCE in a short time to request for computation to restore LSPs when a failure occurs in the network. For example, when a node fails, all the LSPs passing through the node and initiated/ended from the node fail. At the moment, the failed LSPs request the PCE to re-compute the route of new restored LSPs. In this case, these requests are sent to the PCE at a very short time interval. After completing the computation of the computation request received earlier, the PCE must lock or reserve these resources, otherwise, these resources are regarded to be idle and are further used in the path computations performed in response to the subsequent computation requests, so as to result in a resource conflict. The scenario exists in the computation for the restored path in a single-domain or a multi-domain network.

Scenario 1.2: batch routing computation is executed.

When needing to execute batch routing computation but not having concurrent computation capability, the PCE needs to execute multiple computations in series. Like the scenario above, a resource conflict may occur.

Scenario 2: computation results need to be synchronized in time when multiple PCEs cooperate.

Scenario 2.1: multi-domain computation is solved by a multi-PCE cooperative architecture using a Backward Recursive PCE-based Computation (BRPC).

When the multi-PCE cooperation and the BRPC algorithm are adopted, computation is started from the domain where the destination node is located. The optimal path from each entrance node to the destination node is computed in each domain, then, a set of computed paths is transmitted to an adjacent upstream PCE, and finally, an optimal end-to-end path is generated after the computation in a head domain.

Therefore, for an intermediate domain and a tail domain except for the head domain, if there are N entrance boundary nodes in a certain domain, N potential paths may be returned to the upstream domain after the computation in the domain is completed, and only one of the N paths is taken after the final end-to-end computation is successful.

Therefore, after the computation in each domain is completed, a resource conflict may also occur if the computation result is not saved.

Scenario 2.2: a multi-domain computation is solved by the multi-PCE cooperative architecture using a hierarchical PCE.

When cross-domain or cross-layer computation is solved by a hierarchical PCE, multiple sub-domains form one parent domain. Each sub-domain has a corresponding PCE. The PCE in the parent domain maintains interconnection information of sub-domains which is used for computing a domain sequence. Each sub-domain in the parent domain is abstracted into a node. The PCE of each sub-domain needs to establish a session with the PCE in the parent domain and reports connectivity with other domains to the PCE in the parent domain. Therefore, the PCE in the parent domain can acquire the connectivity of all the sub-domains and can compute the domain sequence.

During the computation of a cross-domain path, the parent domain receives a computation request and computes the domain sequence, and then, sends the request to each sub-domain in the domain sequence. When the computation in all the sub-domains is completed, the parent domain collects the computation results in all the sub-domains, splices the computation results to generate an end-to-end path computation result and returns the computation result to a PCC.

Therefore, when the computation in part of the sub-domains is successful, the computation results need to be saved, otherwise, a resource conflict may occur. Furthermore, after the end-to-end computation is completed, it is necessary to notify each PCE participating in the computation to update the resources, otherwise, a resource conflict may still occur, this is because the computation in some domains is successful but the computation in other domains is unsuccessful.

Scenario 2.3: a resource conflict occurs among multiple PCEs during a multi-domain computation.

In the scenario in which multiple PCEs cooperate to solve a cross-domain computation, when there are two domains A and B, a PCE is deployed in each domain respectively. The PCEs in the domains A and B create LSPs at the same time, wherein the head node and the tail node of one LSP1 are in the A domain and B domain respectively, while the head node of another LSP2 is in the B domain. If a resource conflict may occur in LSP2, the LSP updates the resources in PCE1 but the notification message about the updating is not sent to a downstream PCE, while PCE3 also updates the resources in LSP2 at the moment, thereby, the resources of LSP1 may be used.

Scenario 3: the PCE is synchronized with network resources.

After the PCE completes the path computation, the LSR in the network establishes or deletes an LSP in the subsequent signalling process. After the LSP is established or deleted successfully, it is necessary to notify the PCE of the new occupation condition of the network resources at once. If the notification is not given, the link state is flooded by an Internet Gateway Protocol (IGP). In the period between the successful establishment of the connection and the synchronization of the TEDs of all the LSRs in the whole network completed by flooding, a resource conflict may also occur as data in the TED of the PCE are not consistent with that in the TEDs of the LSR nodes in the network.

It can be seen from what described in the scenarios above that the stateful PCE performs path computation not only based on the topological information in the TED but also using the information of the known paths and occupied resources in the network, so as to avoid the resource conflict. However, the computation accuracy of the stateful PCE mainly depends on the accuracy of the information, such as the occupied resources and the computation results, which the stateful PCE is aware of, but the amount of information which the stateful PCE is aware of is very limited at present, as a result, the resource conflict may still occur even the path computation is performed by the stateful PCE.

SUMMARY

The disclosure provides a processing method for a stateful PCE and a stateful PCE, in order to at least solve the problem.

In one aspect, the disclosure provides a processing method for a stateful PCE, including the following steps: the stateful PCE completing path computation of the stateful PCE, and reserving or locking resources needed by a computed path; the stateful PCE receiving a first notification message, wherein the first notification message is used for notifying the stateful PCE of a path which is unsuccessfully established during a Resource Reservation Protocol (RSVP) signalling procedure or a path which is successfully deleted during an RSVP signalling procedure; and the stateful PCE releasing the resources needed by the path notified by the first notification message.

In the above, the locking refers to that the PCE sets a locking flag for the resources in a local TED, and the resources with the locking flag cannot be used for the path computation of the PCE.

Preferably, under a condition of multi-domain path computation, before the stateful PCE receives the first notification message, the method further includes: the first PCE which receives a computation request sending a second notification message to each stateful PCE which participates in the computation, wherein the second notification message is used for notifying an end-to-end path computation result; and each stateful PCE which participates in the computation releasing all reserved or locked resources, which correspond to the computation request, in the PCE if the end-to-end path computation result indicates that the computation is unsuccessful.

Preferably, under the condition of the multi-domain path computation, releasing all the reserved or locked resources, which correspond to the computation request, in the PCE includes: releasing the reserved or locked resources which correspond to the computation request when a second notification message timer started after the stateful PCE receives the second notification message is due to expire.

Preferably, under a condition that the end-to-end path computation result indicates that the computation is successful, the method further includes: under a condition that the multi-domain path computation is performed by a Backward Recursive PCE-based Computation (BRPC) way, indicating a successfully-computed end-to-end path by the end-to-end path computation result; after the second notification message that the computation is successful is received, each PCE which participates in BRPC computation releasing all reserved or locked resources, which correspond to the multi-domain path computation except for resources needed by the successfully-computed end-to-end path, in the PCE; and under a condition that the multi-domain path computation is performed in a hierarchical PCE way, a stateful PCE in a parent domain and a stateful PCE in each sub-domain which participate in the multi-domain path computation preserving the reserved or locked resources which correspond to the multi-domain path computation.

Preferably, under the condition that the multi-domain path computation is performed in the BRPC way, the first notification message and the second notification message are sent from a stateful PCE in a head domain to each stateful PCE, which participates in the computation, on a PCE chain.

Preferably, under the condition that the multi-domain path computation is performed in the hierarchical PCE way, the first notification message and the second notification message are sent from the stateful PCE in the parent domain to each stateful PCE, which participates in the computation, in each sub-domain.

Preferably, the second notification message is a PCE Communication Protocol notification (PCNtf) message; a Notification-type is configured in a NOTIFICATION object of the second notification message to be the end-to-end path computation result, and a notification value is successful or unsuccessful; a PATH is configured in the second notification message, wherein the PATH carries an Explicit Route Object (ERO) which is used for indicating the successfully-computed end-to-end path.

Preferably, the PATH further carries a bandwidth object (BANDWIDTH) and/or a tag object, which is/are used for indicating resources needed by the successfully-computed end-to-end path.

Preferably, the first notification message is a PCNtf message; a Notification-type is configured in a NOTIFICATION object in the first notification message to be path deletion; a PATH is configured in the first notification message, wherein the PATH carries an ERO which is used for indicating the path which is unsuccessfully established or the path which is successfully deleted.

Preferably, the PATH further carries a bandwidth object (BANDWIDTH) and/or a tag object, which is/are used for indicating resources needed by the path which is unsuccessfully established or the path which is successfully deleted.

Preferably, under a condition of multi-domain path computation, the stateful PCE releasing the resources needed by the path notified by the first notification message includes: releasing the resources needed by the path notified by the first notification message in the reserved or locked resources when a first notification message timer started after the stateful PCE receives the first notification message is due to expire.

Preferably, the stateful PCE reserves or locks the resources needed by the computed path in a Traffic Engineering Database (TED).

Preferably, the stateful PCE further saves a computation result when completing the path computation of the stateful PCE; the stateful PCE further deletes a computation result corresponding to a path using the released resources when releasing the resources.

In another aspect, the disclosure provides a stateful Path Computation Element (PCE), including: a path computation module, which is configured to complete path computation of the stateful PCE; a resource processing module, which is configured to reserve or lock resources needed by a computed path; a receiving module, which is configured to receive a first notification message, wherein the first notification message is used for notifying the stateful PCE of a path which is unsuccessfully established during a Resource Reservation Protocol (RSVP) signalling procedure or a path which is successfully deleted during an RSVP signalling procedure; and a resource releasing module, which is configured to release the resources needed by the path notified by the first notification message.

Through the disclosure, the stateful PCE reserves or locks the resources needed by the computed path when completing the path computation, and releases the reserved or locked resources according to the unsuccessfully-established end-to-end path or successfully-deleted end-to-end path indicated by the notification message, so as to avoid resource conflict caused by inaccurate path computation of the stateful PCE in the related arts, and improve the real-time property and accuracy of the resource information which the stateful PCE is aware of and the accuracy of the path computation of the PCE, thereby solving the problem of resource conflict.

BRIEF DESCRIPTION OF THE DRAWINGS

Drawings, provided for further understanding of the disclosure and forming a part of the specification, are used to explain the disclosure together with embodiments of the disclosure rather than to limit the disclosure, wherein.

DETAILED DESCRIPTION OF THE EMBODIMENTS

The disclosure will be described in detail below with reference to the drawings and embodiments. It should be noted that, in the case of no conflict, the embodiments of the application and features therein can be combined with each other.

Figure 1:
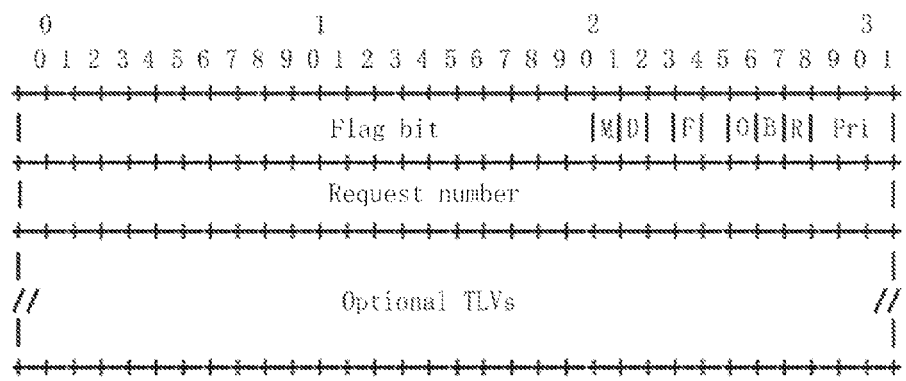
FIG. 1 is a schematic diagram showing the format of an RP object in a notification message according to the related arts.
Figure 2:
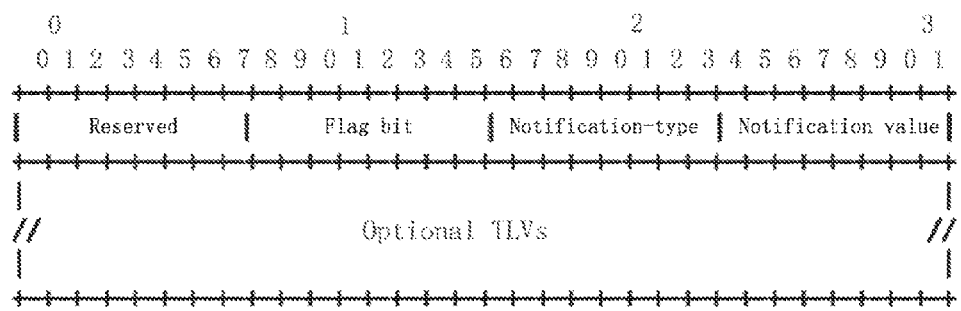
FIG. 2 is a schematic diagram showing the format of a NOTIFICATION object according to the related arts.
Figure 3:
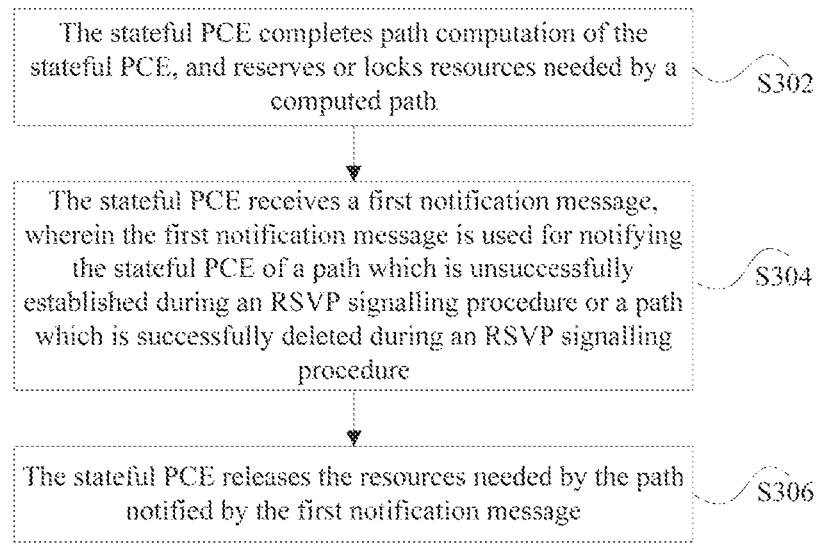
FIG. 3 is a flowchart of a processing method for a stateful PCE according to an embodiment of the disclosure.

FIG. 3 is a flowchart of a processing method for a stateful PCE according to an embodiment of the disclosure. The method includes the following steps:

Step S302: the stateful PCE completes path computation of the stateful PCE, and reserves or locks resources needed by a computed path;

Step S304: the stateful PCE receives a first notification message, wherein the first notification message is used for notifying the stateful PCE of a path which is unsuccessfully established during an RSVP signalling procedure or a path which is successfully deleted during an RSVP signalling procedure; and Step S306: the stateful PCE releases the resources needed by the path notified by the first notification message.

Through the steps above, the stateful PCE reserves or locks the resources needed by the computed path after completing its own path computation, so as to prevent the resources from being used in the next computation. After the path computation is successful, if the path is established unsuccessfully during the subsequent RSVP signalling establishment procedure or is deleted in an RSVP signalling procedure, the PCE is notified to delete the path or connection by the notification message, and the PCE releases the resources needed by theses paths. Therefore, the computation result of the path using these resources can also be generated in the subsequent computation. The method improves the real-time property and accuracy of the resource information which the stateful PCE is aware of and the accuracy of the path computation of the PCE, so as to avoid resource conflict.

It should be noted that the method above aims to reserve or lock the resources needed by the computed path so as to prevent the resources from being used in the path computation of the PCE. The resources can be reserved or locked by multiple ways, for example, the PCE sets a locking flag for the resources in a local TED, and the resources with the locking flag cannot be used in the path computation of the PCE. Of course, the aim of reservation or locking can also be achieved by other ways according to an actual condition.

The method is suitable in an integrated PCE scenario and a distributed PCE scenario (multiple PCEs cooperate to compute a cross-domain path, such as a BRPC scenario and a hierarchical PCE scenario).

Figure 11:
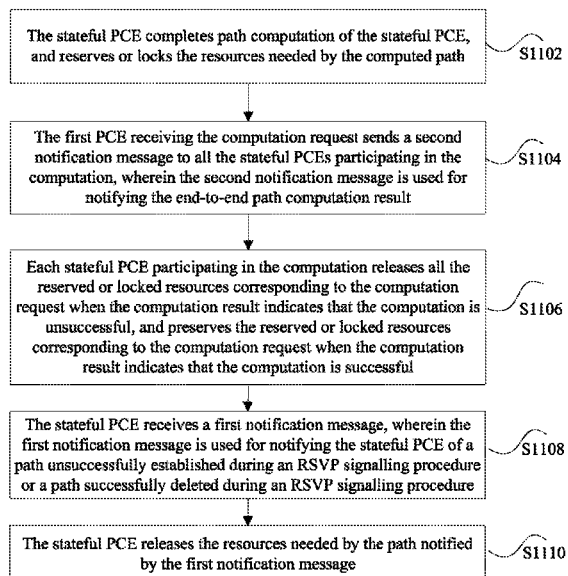
FIG. 11 is a diagram showing the detailed flow of a processing method for a stateful PCE according to an embodiment of the disclosure.

Both scenarios 1 and 2 refer to that the PCE needs to save the computation result and reserve (or lock) the resources when completing the computation. In the scenario 2, when multiple PCEs cooperate to solve the cross-domain computation, no matter the route is computed by the BRPC or the hierarchical PCE, it is further necessary to notify, after the end-to-end computation is ended, the PCE in each domain of the final computation result to update the state of the resources and services in time, besides saving and locking the resources after the computation in each domain is completed. Therefore, if the computation of the whole end-to-end link is unsuccessful, the reserved or locked resources can be released in the case of unsuccessful establishment, so as to prevent the resources from still being reserved or locked by the stateful PCE and enable the resources to be available. FIG. 11 is a diagram showing the detailed flow of a processing method for a stateful PCE according to an embodiment of the disclosure, as shown, the method specifically includes the following steps.

Step S1102: the stateful PCE completes path computation of the stateful PCE, and reserves or locks resources needed by a computed path.

Step S1104: the first PCE receiving a computation request sends a second notification message to each stateful PCE which participates in the computation, wherein the second notification message is used for notifying an end-to-end path computation result.

Step S1106: each stateful PCE participating in the computation releases all reserved or locked resources corresponding to the computation request if the end-to-end path computation result indicates that the computation is unsuccessful. In specific implementation, the stateful PCE can start a second notification message timer after receiving the second notification message and execute the releasing process when the second notification message timer is due to expire. The reserved or locked resources corresponding to the computation request are preserved when the computation result indicates that the computation is successful.

Step S1108: the stateful PCE receives a first notification message, wherein the first notification message is used for notifying the stateful PCE of a path which is unsuccessfully established during a Resource Reservation Protocol (RSVP) signalling procedure or a path which is successfully deleted during an RSVP signalling procedure.

Step S1110: the stateful PCE releases the resources needed by the path notified by the first notification message. In specific implementation, the stateful PCE can start a first notification message timer after receiving the first notification message, and execute the releasing process when the first notification message timer is due to expire.

If the end-to-end path computation result indicates that the computation is successful, the following processing ways can be adopted.

(1) Under a condition that the multi-domain path computation is performed by a Backward Recursive PCE-based Computation (BRPC) way, a successfully-computed end-to-end path is indicated by the end-to-end path computation result. After the second notification message that the computation is successful is received, each PCE participating in BRPC computation releases all reserved or locked resources, which correspond to the multi-domain path computation except for resources needed by the successfully-computed end-to-end path, in the PCE. When the BRPC way is adopted to perform the multi-domain path computation, there may be multiple potential optimal paths generated by the computation of the stateful PCE in each domain. Therefore, after the whole end-to-end path is computed successfully, the PCE in the head domain notifies each PCE on a PCE chain of the final end-to-end computation result at once. When the end-to-end computation is successful, each stateful PCE preserves the reserved or locked resources used on the successfully-computed path, and releases the resources on other potential paths except for the successfully-computed path, and the released resources can be used in the subsequent computation. When the end-to-end computation is unsuccessful, all the computation results, and reserved or locked resources (the resources on all the potential paths) related to the computation are released, and the released resources can be used in the subsequent computation.

(2) Under a condition that the multi-domain path computation is performed in a hierarchical PCE way, a stateful PCE in a parent domain and a stateful PCE in each sub-domain participating in the multi-domain path computation preserves the reserved or locked resources which correspond to the multi-domain path computation. When the end-to-end path computation is successful, it is indicated that the computation of the PCEs of all the sub-domains is successful, so the PCEs should preserve the reserved or locked resources to prevent the resources from being used in the subsequent computation, thereby avoiding resource conflict. When the end-to-end path computation is unsuccessful, the stateful PCE in the parent domain and the stateful PCE in each sub-domain delete the computation to prevent the resources from being used in the subsequent computation, thereby avoiding resource conflict.

Preferably, when the multi-domain path computation is performed in the BRPC way, the first notification message and the second notification message are sent from the stateful PCE, which receives the path computation request of the PCC, in the head domain to all other stateful PCEs on the PCE chain participating in the computation. When the multi-domain path computation is performed in the hierarchical PCE way, the first notification message and the second notification message are sent from the stateful PCE in the parent domain to the stateful PCE, which participates in the computation, in each sub-domain.

The second notification message may be a PCNtf message. The second notification message may be set in the following ways in order to notify the stateful PCE of the end-to-end path computation result. The Notification-type is configured in a NOTIFICATION object of the second notification message to be the end-to-end path computation result, and a notification value is successful or unsuccessful. A PATH is configured in the second notification message, wherein the PATH carries an Explicit Route Object (ERO) which is used for indicating the successfully-computed end-to-end path. Preferably, the PATH further carries a bandwidth object (BANDWIDTH) and/or a tag object, which is/are used for indicating resources needed by the successfully-computed end-to-end path.

The first notification message may be a PCNtf message. The first notification message may be set in the following ways in order to notify the stateful PCE of the information that the end-to-end path is established unsuccessfully or the end-to-end path is deleted successfully. The Notification-type is configured in a NOTIFICATION object in the first notification message to be path deletion. A PATH is configured in the first notification message, wherein the PATH carries an ERO which is used for indicating the path which is unsuccessfully established or the path which is successfully deleted. Preferably, the PATH further carries a bandwidth object (BANDWIDTH) and/or a tag object, which is/are used for indicating resources needed by the path which is unsuccessfully established or the path which is successfully deleted.

Preferably, the stateful PCE reserves or locks the resources needed by the computed path in a TED.

The stateful PCE may further save a computation result when completing the path computation of the stateful PCE. The stateful PCE may further delete a computation result corresponding to a path using the released resources when releasing the resources.

Figure 4:
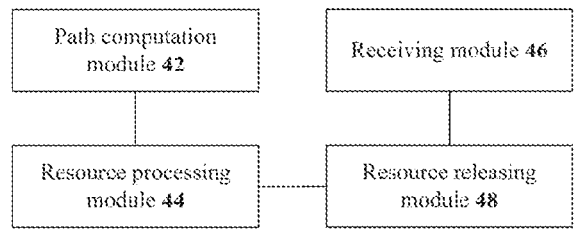
FIG. 4 is a block diagram showing the structure of a stateful PCE according to an embodiment of the disclosure.

FIG. 4 is a block diagram showing the structure of a stateful PCE according to an embodiment of the disclosure. As shown in FIG. 4, the stateful PCE includes: a path computation module 42, which is configured to complete path computation of the stateful PCE; a resource processing module 44, which is configured to reserve or lock resources needed by a computed path; a receiving module 46, which is configured to receive a first notification message, wherein the first notification message is used for notifying the stateful PCE of a path which is unsuccessfully established during an RSVP signalling procedure or a path which is successfully deleted during an RSVP signalling procedure; and a resource releasing module 48, which is configured to release the resources needed by the path notified by the first notification message.

The embodiments 1 to 3 below synthesize the technical solutions of the preferred embodiments above.

Embodiment 1

The embodiment describes the processing procedure for implementing the method by an extended PCEP. The extended PCEP includes contents as follows.

(1) The Notification-type in the NOTIFICATION object is extended and one Notification-type is added. During the cooperative computation for a multi-layer and multi-domain route of multiple PCEs, the added Notification-type is used for notifying each PCE participating in the computation of the end-to-end route computation result after the end-to-end path computation is completed.

Notification-type=TBD: end-to-end path computation result;

Notification-value=TBD: successful end-to-end computation;

Notification-value=TBD: unsuccessful end-to-end computation.

(2) The Notification-type in the NOTIFICATION object is extended, and another Notification-type is added. During the path computation of a single PCE or multiple PCEs, the another Notification-type that is added is used for notifying one or more PCEs participating in the computation of the establishment or deletion result of the LSP after the LSP is established successfully or unsuccessfully or the LSP is deleted successfully, so that the information of resources and data in the TED of the PCE can be synchronized and updated. When multiple paths (connections) are computed in a computation request, besides specifying the request ID, the notification message may further notify which connection needs to be deleted (which can be implemented by combining with the following extended way (3)) by the carried PATH.

Notification-type=TBD: PATH deletion, the PCE is notified to delete the connection when the connection is established unsuccessfully or the connection is deleted successfully;

Notification-value=TBD: delete PATH.

(3) PATH has been defined in the PCRep (path computation result) message in the RFC5440. The notification message of the PCEP (PCNtf message) is extended, and the definition of the PATH in the PCRep message is added in the PCNtf message. After being extended, the PCNtf message can be used for describing what path the extended notification in the disclosure corresponds to. The reason is that the PATH can carry an ERO and other objects, which are used for indicating the path needing to be updated, and the PATH can carry a BANDWIDTH, tag and other objects, which are used for indicating the resources on the path.

In combination with the extension (1), the extension (3) can be used for indicating the specific path information, including the path and resources, about the successful or unsuccessful end-to-end computation.

In combination with the extension (2), the extension (3) can be used for indicating the specific path information, including the path and resources, which needs to be deleted. The format of the extended Notification message is as follows:

```
<PCNtf Message> ::= <Common Header>
                    <notify-list>
<notify-list> ::= <notify> [<notify-list>]
<notify> ::= [<request-id-list>]
             <notification-list>
<request-id-list> ::= <RP>
                      [<path-list >]    //newly added
                      [<request-id-list>]
<path-list>::=<path> [<path-list>]      //newly added
<path> ::= <ERO><attribute-list>        //newly added
<notification-list> ::= <NOTIFICATION>[<notification-list>]
```

In combination with the extended PCNtf message structure, the process for implementing the stateful PCE is described as follows.

The stateful PCE computes a path not only based on the topological information in a TED but also using the information of the known paths and the occupied resources in a network.

In view of the above, the PCE needs to record the computation result and the used resources in time and also needs to reserve or lock the resources used in the computed path in the TED of the PCE in time. In a cross-domain scenario, multiple PCEs need to cooperate to acquire the final path computation result. In this case, the PCEs need to synchronize the path computation result and resources with one another in time. After the LSP signalling procedure is completed, it is also necessary to notify all the PCEs related to the LSP to update the state of the resources in time and preserve the reserved or locked resources or release the resources according to the notification message.

In the embodiment, in order to be stateful, the PCE saves its complete computation result. including the computed paths and the resources, therein after completing each computation, and reserves or locks the resources used by the computed path in the TED of the PCE, to prevent the resources from being used by the subsequent computation request, thereby avoiding a resource conflict.

When multiple PCEs cooperate to compute a cross-domain path in the BRPC way, the path computation result is saved after the computation in each domain is completed; at the same time, the resources of all the potential paths are reserved or locked in the PCE. Finally, after the end-to-end computation is completed, the PCE in the head domain where the source node is located notifies other domains on the PCE chain (including intermediate domain through which the path passes and the tail domain where a destination node is located) of the information that the end-to-end computation result is successful or unsuccessful by an extended notification message while saving the computation result and reserving or locking the resources in the domain. Meanwhile, the notification message can specify the ID of the computation request by the RP object and include the completed computed end-to-end path information by an extended ERO. After receiving a notification that the computation is successful, the PCEs on the PCE chain release the resources in all the potential paths except for the path in the ERO. If the notification that the computation is unsuccessful is received, all the resources related to the computation request are released and the saved path computation result is also deleted.

Similarly, when a cross-domain path is computed in the hierarchical PCE way, the PCE in the parent domain receives a computation request, computes the domain sequence, and then sends the request to the PCE in each sub-domain in the domain sequence. The PCE in each sub-domain returns the computation result to the PCE in the parent domain, saves the computation result in the PCE, and reserves or locks the resources used by the computed path in the TED of the PCE after completing the computation. After the computation in all the sub-domains is completed, the PCE in the parent domain collects the computation results of all the sub-domains and splices the computation results to generate an end-to-end path result to return the result to the PCC. At the same time, the PCE in the parent domain notifies the PCE in each sub-domain of the end-to-end computation result. The sub-domain continuously preserves the reserved or locked resources if receiving the notification that the computation is successful and releases the reserved or locked resources and deletes the saved computation result if receiving the notification that the computation is unsuccessful.

After the end-to-end path computation is successful, the subsequent signalling procedure is continued to establish the LSP. When the connection is established successfully, the PCE is notified of the connection establishment result by a PCEP notification message. If receiving the notification that the connection is established successfully, the PCE continues preserving the reserved or locked resources. If receiving the notification that the connection is established unsuccessfully, the PCE deletes the saved information about the computed path and resources, and releases the reserved or locked resources. Similarly, in a multi-PCE cooperative cross-domain scenario, when a BRPC way is adopted, the notification is sent to the PCE in the head domain at first; then, the PCE in the head domain forwards the notification message to the PCEs on the way along the PCE chain. Each PCE continues preserving the reserved or locked resources if receiving the notification that the computation is successful, and deletes the saved information about the computed path and resources and releases the reserved or locked resources if receiving the notification that the computation is unsuccessful. In a multi-PCE cooperative cross-domain scenario, when an H-PCE is adopted, the notification is sent to the PCE in the parent domain at first; then, the PCE in the parent domain forwards the notification message to the PCE in each sub-domain. Each PCE continues preserving the reserved or locked resources if receiving the notification that the computation is successful, and deletes the saved information about the computed path and resources and releases the reserved or locked resources if receiving the notification that the computation is unsuccessful.

Embodiment 2

Figure 5:
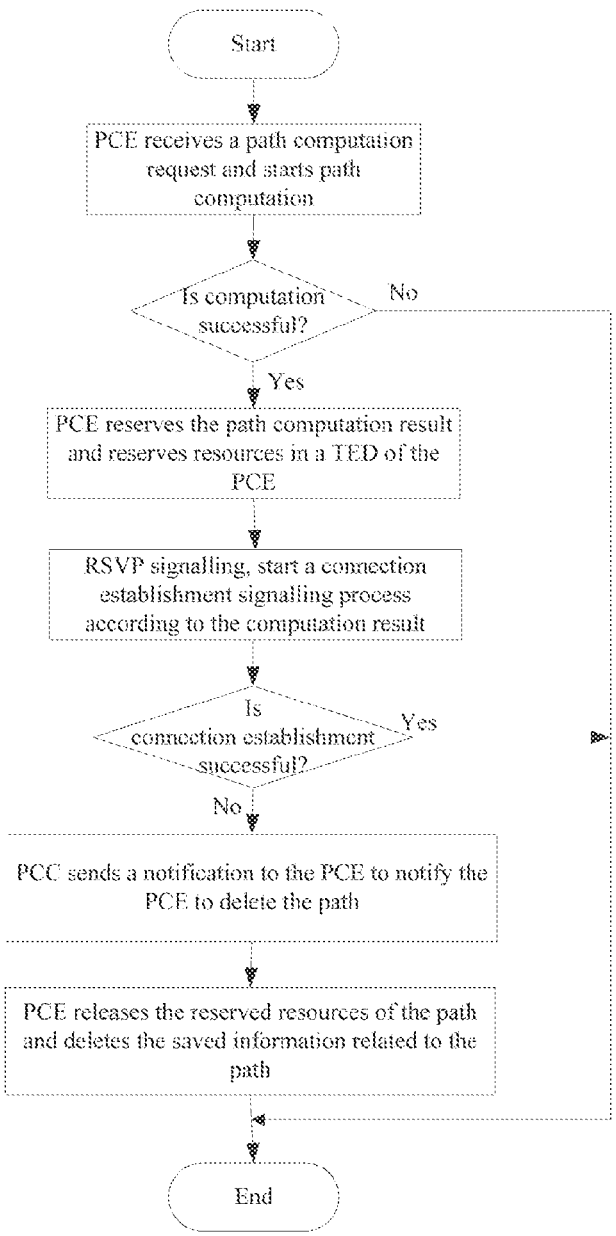
FIG. 5 is a flowchart showing the synchronization process of a stateful PCE when a single PCE completes path computation independently according to the second embodiment.

The embodiment describes the synchronization process of a stateful PCE when a single PCE completes the path computation independently. FIG. 5 is a flowchart showing the synchronization process of a stateful PCE when a single PCE completes path computation independently according to the second embodiment, and the process includes the following steps.

Step 1: the PCE starts path computation after receiving a path computation request.

Step 2: whether the path computation is successful is judged, if so, Step 3 is executed, otherwise, the processing is ended.

Step 3: the PCE preserves the path computation result and reserves or locks the resources needed by the computed path in the TED.

Step 4: a path establishment procedure is started between the start point and the end point of the path by an RVSP signalling.

Step 5: whether the establishment of the path is successful is judged, if so, Step 6 is executed, otherwise, the processing is ended.

Step 6: the PCC sends a notification to the PCE to notify the PCE to delete related information of the path and reserve or lock the resources.

Step 7: the PCE releases the reserved or locked resources of the path, and deletes the saved information related to the path.

The mechanism for implementing the stateful PCE is described below with the first domain (the domain where PCE1 is located) in FIG. 7 as an example. For example, when the path from A to E needs to be computed, A sends a computation request PCReq message to PCE1, which computes the optimal path from A to E. If the computation is successful, PCE1 saves the computation result locally and reserves or locks, in the local TED, the resources of the optimal path in the domain. PCE1 returns a computation result to A by a PCRep message.

Subsequently, a connection establishment procedure is started during an RSVP signalling procedure. A sends a notification to PCE1 by an extended PCNtf message after the connection establishment is completed. If the establishment is unsuccessful, PCE1 deletes the locally saved information about the computed path and resources.

Embodiment 3

Figure 6:
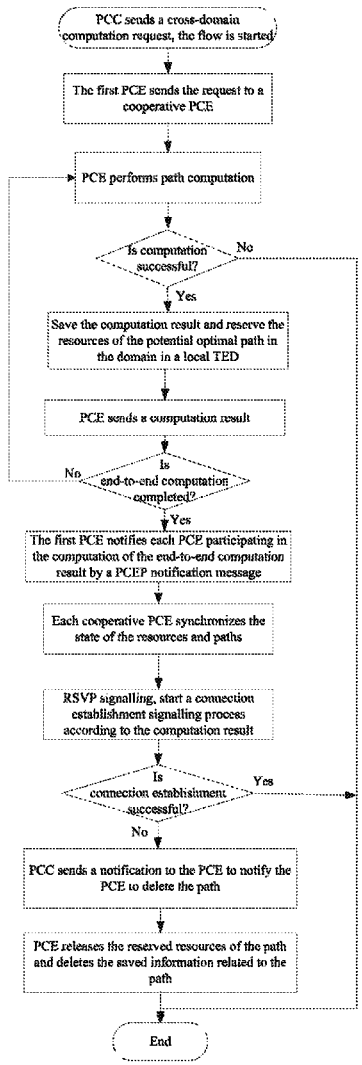
FIG. 6 is a flowchart showing the synchronization process of a stateful PCE when multiple PCEs cooperate to complete end-to-end path computation according to the third embodiment.

FIG. 6 is a flowchart showing the synchronization process of a stateful PCE when multiple PCEs cooperate to complete end-to-end path computation according to the third embodiment, as shown, the process includes the following steps.

Step 1: a PCC sends a cross-domain computation request.

Step 2: the first PCE (the PCE which receives the computation request of the PCC; specifically, for a BRPC algorithm, the PCE is the one in the head domain responsible for constructing a PCE chain and sending the request to the PCE in the tail domain along the PCE chain; for a hierarchical PCE algorithm, the PCE is the one in the parent domain responsible for computing the domain sequence and sending the request to the PCE in each sub-domain) sends the request to a cooperative PCE.

Step 3: the PCE performs path computation.

Step 4: whether the computation is successful is judged, if so, Step 5 is executed, otherwise, the processing is ended.

Step 5: the PCE saves the computation result and reserves or locks, in a local TED, the resources of the potential optimal cost path in the domain.

Step 6: the PCE sends the computation result. Specifically, the PCE sends the computation result to the PCE in the head domain step by step for the BRPC algorithm, and to the PCE in the parent domain for the hierarchical PCE algorithm.

Step 7: whether the end-to-end computation is completed is judged, if so, Step 8 is executed, otherwise, Step 3 is executed.

Step 8: the first PCE notifies each PCE participating in the computation of the end-to-end computation result by a PCEP notification message.

Step 9: each cooperative PCE synchronizes the state of the resources and the paths. When the BRPC algorithm is adopted, each PCE deletes the excessive potential path and resources if the end-to-end computation is successful and deletes all paths and resources related to the computation if the computation is unsuccessful.

When the hierarchical PCE algorithm is adopted, each PCE in the sub-domain deletes the path related to the computation and the corresponding resources if the end-to-end computation is unsuccessful.

Step 10: a path establishment process is started between the start point and the end point of the path by an RVSP signalling.

Step 11: whether the establishment of the path is successful is judged, if so, Step 12 is executed, otherwise, the processing is ended.

Step 12: the PCC sends a notification to the PCE to notify the PCE to delete the path.

Step 13: the PCE releases the reserved or locked resources of the path, and deletes the saved information related to the path.

The processing way for the BRPC algorithm and the hierarchical PCE algorithm is described below by examples.

Figure 7:
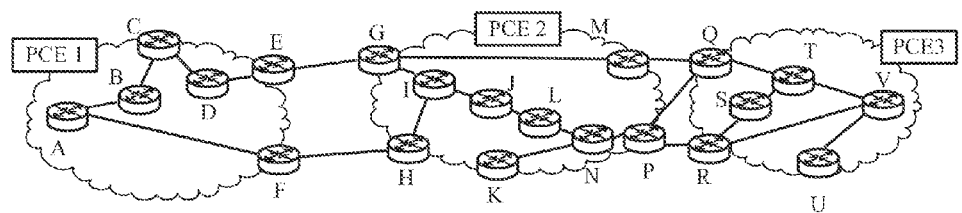
FIG. 7 is schematic diagram showing network topology when a BRPC algorithm is adopted in a cross-domain multi-PCE cooperative computation scenario according to the third embodiment.

FIG. 7 is schematic diagram showing network topology when a BRPC algorithm is adopted in a cross-domain multi-PCE cooperative computation scenario according to the third embodiment. In FIG. 7, each cloud represents one AS, and one PCE is deployed in each AS, respectively being PCE1, PCE2, PCE3 and PCE4. A-V represent LSRs in each domain.

When requesting to compute the path from A to V, the LSR A sends a computation request to the PCE in the domain, i.e., PCE1. PCE1 sends the request to PCE2 and then to PCE3 according to the domain sequence, wherein three PCEs form the domain sequence of the domains. PCE3 starts the path computation process as follows after receiving the request.

PCE3 computes the minimum spanning tree VSPT from entrances Q and R to the destination V:

QTV cost 2; QTSRV cost 4
RSTV cost 3; RV cost 1

Figure 8:
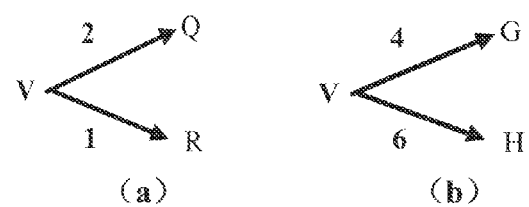
FIG. 8*a* is a schematic diagram showing a minimum spanning tree computed by PCE3 according to the third embodiment.
FIG. 8*b* is a schematic diagram showing a minimum spanning tree computed by a PCE2 according to the third embodiment.

FIG. 8a is a schematic diagram showing a minimum spanning tree computed by PCE3 according to the third embodiment. PCE3 provides PCE2 with the minimum spanning tree by a PCRep message, then saves the computation result, and reserves or locks, in the local TED, the resources of the potential optimal cost path in the domain, i.e., the resources from Q to V, and from R to V.

After receiving the computation result from PCE3, PCE2 computes the overhead from the entrances G and H of domain 2 to V to obtain:

GMQ..V cost 4; GIJLNPR..V cost 7; GIJLNPQ..V cost 8
HIJLNPR..V cost 7; HIGMQ..V cost 6; HIJLNPQ..V cost 8

FIG. 8b is a schematic diagram showing a minimum spanning tree computed by a PCE2 according to the third embodiment. PCE2 provides PCE1 with the minimum spanning tree by a PCRep message, then saves the computation result, and reserves or locks, in the local TED, the resources of the potential optimal cost path in the domain, i.e., the resources from G to Q, and from H to Q.

After receiving the computation result of PCE2, PCE1 computes the overhead from A to V to obtain:

ABCDEG..V cost 9
AFH..V cost 8

PCE1 selects the optimal path AFHIGMQTV, the cost of which is 8. Then, PCE1 saves the computation result and reserves or locks, in the local TED, the resources of the optimal path in the domain, i.e., the resources from A to F.

After the end-to-end computation is completed, PCE1 sends a PCRep message to the PCC (i.e., LSR A) to notify the PCC of the end-to-end computation result. Meanwhile, PCE1 sends a PCNtf message to PCE2 and PCE3 along the PCE chain to notify PCE2 and PCE3 of the end-to-end connection computation result by the extended message type. Furthermore, the successfully-computed end-to-end path is carried in the message by the ERO, and the resources used on the end-to-end path are carried in BANDWIDTH and other objects.

If the computation is successful, PCE2 and PCE3 preserve the resources on the optimal path and release the resources on other potential optimal paths after receiving the notification that the end-to-end computation is successful. For example, PCE3 checks that the path of the end-to-end computation result in the current domain is QTV, therefore, PCE3 releases the resources on the potential optimal path RSV and only preserves the resources on the optimal path QTV. Similarly, PCE2 also checks the path of the end-to-end computation result in the current domain, therefore, PCE2 only preserves the resources on the optimal path and releases the resources on other potential optimal paths.

If the computation is unsuccessful, PCE2 and PCE3 release all the resources related to the computation and delete the locally saved computation request and result after receiving the notification that the end-to-end computation is unsuccessful. For example, PCE3 releases all the resources on the potential paths RSV and QTV.

Subsequently, a connection establishment process is started during the RSVP signalling procedure from A to V. After the end-to-end connection establishment is completed, PCE1, PCE2 and PCE3 continue preserving the saved information and reserved or locked resources if the establishment is successful. If the establishment is unsuccessful, the LSR A reports the notification that the connection establishment is unsuccessful to PCE1 by the extended PCNtf message. At the same time, PCE1 sends the PCNtf message to PCE2 and PCE3 along the PCE chain to notify each PCE to delete the resources. PCE1, PCE2 and PCE3 delete the locally reserved or locked resources and also delete the locally saved computation requests and result data related to the computation.

Similarly, when the connection is deleted, LSR A also sends the notification above, and PCE1, PCE2 and PCE3 complete the deletion of the resources and data.

Figure 9:
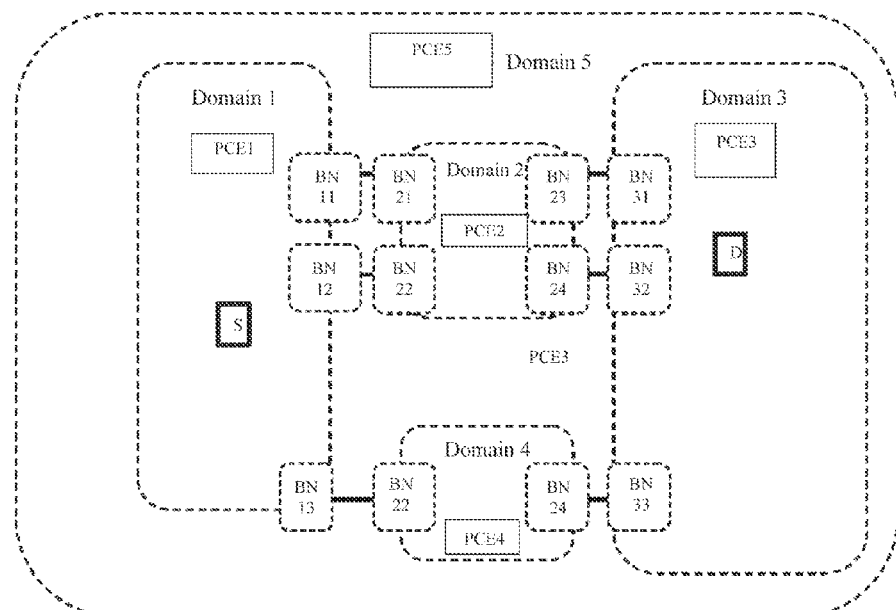
FIG. 9 is a schematic diagram showing the deployment of network topology and PCEs when a cross-domain path is computed by a hierarchical PCE in the cross-domain computation scenario according to the fourth embodiment.

FIG. 9 is a schematic diagram showing the deployment of network topology and PCEs when a cross-domain path is computed by a hierarchical PCE in the cross-domain computation scenario according to the fourth embodiment. As shown in FIG. 9, the hierarchical PCE (H-PCE) can provide the computation flow of the end-to-end cross-domain path computation method, the computation flow including the selection of the domain sequence and the end-to-end cross-domain path. In the hierarchical PCE technology, the parent (the upper layer) PCE maintains a domain topology map, namely, regarding each sub-domain as a node and maintaining the connection relationship among the domains. The sub-PCEs in the sub-domains are responsible for computing the path in the sub-domains. In this way, a hierarchical relation is formed among the PCEs. The hierarchical relation can be two-layered or multi-layered.

Figure 10:
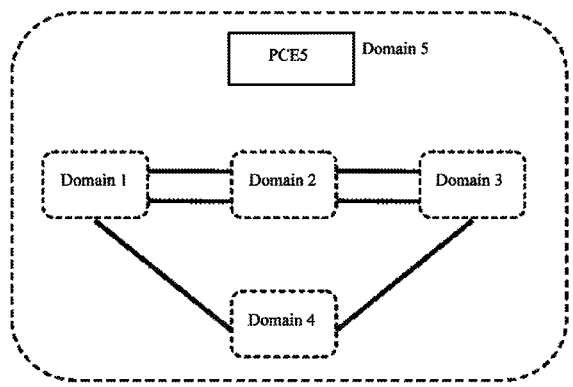
FIG. 10 is a schematic diagram showing the relationship between domains during the cross-domain computation of a hierarchical PCE in a cross-domain computation scenario according to the fourth embodiment.

As shown in FIG. 9, four sub-domains (Domain 1-Domain 4) form a parent domain (Domain 5). Each sub-domain has a corresponding PCE for computing the intra-domain path. The PCE in the parent domain maintains the interconnection information of the sub-domains, wherein the interconnection information is used for computing the domain sequence. Each sub-domain is abstracted into a node in PCE5. The topological information saved in the PCE in the parent domain is as shown in FIG. 10. The PCE of each sub-domain needs to establish a session with PCE5 in the parent domain and reports the connectivity between the domain corresponding to the current PCE and other domains. Therefore, PCE5 can acquire the connectivity of all the sub-domains and can compute the domain sequence.

It is assumed that the path from the node S to the node D is to be computed, the process is described as follows.

S requests PCE1 to compute the path to D, PCE1 requests PCE5 to compute the domain sequence, and PCE5 determines the possible domain sequence (domain 1-domain 2-domain 3, domain 1-domain 4-domain 3).

PCE5 requests PCE2 to compute the path from a boundary node (adjacent to domain 1) to another boundary node (adjacent to domain 3), requests PCE4 to computed the path from a boundary node (adjacent to domain 1) to another boundary node (adjacent to domain 3), requests PCE1 to compute the path from a source node to a boundary node, and requests PCE3 to compute the path from a boundary node to a destination node.

PCE1 to PCE4 compute the optimal path in the domain and return the result to PCE5 by a PCRep message respectively; and meanwhile, each PCE saves the computation result locally and reserves or locks, in the local TED, the resources of the optimal path in the domain.

After collecting the path computation results of the PCEs in all the sub-domains, PCE5 determines the optimal end-to-end path, and meanwhile, PCE5 saves the computation results locally, reserves or locks, in the local TED, the resources of the optimal path in the domain and returns the end-to-end result to PCE1 by the PCRep message. PCE1 returns the final end-to-end result to S. Meanwhile, PCE 5 notifies PCE1 to PCE4 in each sub-domain of the end-to-end computation result by the extended PCNtf message; and furthermore, the successfully-computed end-to-end path is carried in the message by the ERO and the resources used on the end-to-end path are carried in the BANDWIDTH and other objects.

If the computation is successful, PCE1 to PCE4 preserve the resources on the path of the computation result after receiving the notification that the end-to-end computation is successful. If the computation is successful in part of the sub-domains of PCE1 to PCE4 but unsuccessful in other sub-domains, the final end-to-end computation result is unsuccessful. After PCE1 to PCE 4 receive the notification that the computation is unsuccessful, if the computation result is saved and the resources are reserved or locked in the part of sub-domains in which the computation are successful, such information should be deleted and these resources should be released.

Subsequently, the connection establishment is started during the RSVP signalling procedure. After the end-to-end connection establishment is completed, if the establishment is successful, PCE1 to PCE5 continue preserving the saved information and reserved or locked resources. If the establishment is unsuccessful, LSR S reports the notification that the connection establishment is unsuccessful to PCE1 by the extended PCNtf message; meanwhile, PCE1 sends the PCNtf message to PCE5 in the parent domain. PCE5 deletes the locally saved information about the computed path and resources, and meanwhile sends the PCNtf message to notify PCE1 to PCE4 in each sub-domain to delete the resources. PCE1 to PCE4 delete the locally reversed or locked resources and the locally saved computation request and data of the result related to the computation.

Similarly, when the connection is deleted, LSR A also sends the notification above, with the flow same as above.

It can be seen from the method described in the embodiments that the stateful PCE reserves or locks, in the TED accessed by the PCE, the resources related to the path once the path computation is successful. The PCC needs to notify, by the PCEP, the stateful PCE to synchronize the state of the resources and paths after the connection is established or deleted. The path computed by the stateful PCE can be the one obtained by single domain computation or the one obtained by multiple-domain computation.

During cross-domain computation, the resource and tag information used in the path computation is notified by an extended PCEP notification message, and this operation is very useful in the WSON. When multiple PCEs cooperate to compute the end-to-end path, the PCE initiating the end-to-end path computation notifies, by the PCEP, each cooperative PCE participating in the computation to synchronize the state of the resources and paths after the end-to-end computation is completed. When multiple PCEs cooperate to compute the end-to-end path, after the computation result is obtained, synchronization among cooperative PCEs is realized by the PCEP notification message. When the subsequent connection establishment is completed, each PCE implements resource synchronization among each cooperative PCE and the LSR by the PCEP notification message. Specifically:

(1) when the cross-domain path computation is performed by the BRPC algorithm, after the end-to-end computation is successful, the PCE initiating the end-to-end path computation notifies, by the PCEP, each cooperative PCE participating in the computation to synchronize the state of the resources and paths and each PCE deletes the excessive potential paths and resources; when the cross-domain path computation is performed by the BRPC algorithm, after the end-to-end computation is unsuccessful, the PCE in the head domain notifies, by the PCEP, each cooperative PCE participating in the computation to synchronize the state of the resources and paths and each PCE deletes the paths and resources related to the computation; and (2) when the cross-domain path computation is performed by the hierarchical PCE, after the end-to-end computation is unsuccessful, the PCE in the parent domain notifies, by the PCEP, each PCE participating in the computation to synchronize the state of the resources and paths and each PCE deletes the path related to the computation and the corresponding resources.

It should be noted that the path information and resource information between the PCEs and between the PCE and the LSR can also be synchronized by other similar PCEP message notification ways. For the BRPC, hierarchical PCE or other cross-domain computation methods, the aim of synchronization between the PCE and the LSR can also be achieved only by notifying that the connection establishment is successful or unsuccessful or notifying to delete the failed LSP by the PCEP notification message, without notifying the end-to-end computation result.

To sum up, the solution provided by the embodiments of the disclosure implements finite stateful PCE, and improves the real-time property and accuracy of the resource information which the stateful PCE is aware of and the accuracy of the path computation of the PCE, so as to avoid resource conflict.

Obviously, those skilled in the art shall understand that the above-mentioned modules and steps of the disclosure can be realized by using general purpose calculating device, can be integrated in one calculating device or distributed on a network which consists of a plurality of calculating devices. Alternatively, the modules and the steps of the disclosure can be realized by using the executable program code of the calculating device. Consequently, they can be stored in the storing device and executed by the calculating device, or they are made into integrated circuit module respectively, or a plurality of modules or steps thereof are made into one integrated circuit module. In this way, the disclosure is not restricted to any particular hardware and software combination.

The descriptions above are only the preferable embodiment of the disclosure, which are not used to restrict the disclosure. For those skilled in the art, the disclosure may have various changes and variations. Any amendments, equivalent substitutions, improvements, etc. within the principle of the disclosure are all included in the scope of the protection of the disclosure.

What is claimed is:

1. A method processing for a stateful Path Computation Element (PCE), wherein the method comprises:
    the stateful PCE completing path computation of the stateful PCE, and reserving or locking resources needed by a computed path;
    the stateful PCE receiving a first notification message, wherein the first notification message is used for notifying the stateful PCE of a path which is unsuccessfully established during a Resource Reservation Protocol (RSVP) signalling procedure or a path which is successfully deleted during an RSVP signalling procedure; and
    the stateful PCE releasing the resources needed by the path notified by the first notification message;
wherein, under a condition of multi-domain path computation, before the stateful PCE receives the first notification message, the method further comprises:
    the first PCE which receives a computation request sending a second notification message to each stateful PCE which participates in the computation, wherein the second notification message is used for notifying an end-to-end path computation result; and
    each stateful PCE which participates in the computation releasing all reserved or locked resources, which correspond to the computation request, in the PCE if the end-to-end path computation result indicates that the computation is unsuccessful, wherein the resources are released when a second notification message timer, started after the stateful PCE receives the second notification message, is due to expire.

2. The method according to claim 1, wherein under a condition that the end-to-end path computation result indicates that the computation is successful, the method further comprises:
    under a condition that the multi-domain path computation is performed by a Backward Recursive PCE-based Computation (BRPC) way, indicating a successfully-computed end-to-end path by the end-to-end path computation result; after the second notification message that the computation is successful is received, each PCE which participates in BRPC computation releasing all reserved or locked resources, which correspond to the multi-domain path computation except for resources needed by the successfully-computed end-to-end path, in the PCE; and
    under a condition that the multi-domain path computation is performed in a hierarchical PCE way, a stateful PCE in a parent domain and a stateful PCE in each sub-domain which participate in the multi-domain path computation preserving the reserved or locked resources which correspond to the multi-domain path computation.

3. The method according to claim 2, wherein under the condition that the multi-domain path computation is performed in the BRPC way, the first notification message and the second notification message are sent from a stateful PCE in a head domain to each stateful PCE, which participates in the computation, on a PCE chain.

4. The method according to claim 2, wherein under the condition that the multi-domain path computation is performed in the hierarchical PCE way, the first notification message and the second notification message are sent from the stateful PCE in the parent domain to each stateful PCE, which participates in the computation, in each sub-domain.

5. The method according to claim 2, wherein the second notification message is a PCE Communication Protocol notification (PCNtf) message; a Notification-type is configured in a NOTIFICATION object of the second notification message to be the end-to-end path computation result, and a notification value is successful or unsuccessful; a PATH is configured in the second notification message, wherein the PATH carries an Explicit Route Object (ERO) which is used for indicating the successfully-computed end-to-end path.

6. The method according to claim 5, wherein the PATH further carries a bandwidth object (BANDWIDTH) and/or a tag object, which is/are used for indicating resources needed by the successfully-computed end-to-end path.

7. The method according to claim 1, wherein the first notification message is a PCNtf message; a Notification-type is configured in a NOTIFICATION object in the first notification message to be path deletion; a PATH is configured in the first notification message, wherein the PATH carries an ERO which is used for indicating the path which is unsuccessfully established or the path which is successfully deleted.

8. The method according to claim 7, wherein the PATH further carries a bandwidth object (BANDWIDTH) and/or a tag object, which is/are used for indicating resources needed by the path which is unsuccessfully established or the path which is successfully deleted.

9. The method according to claim 1, wherein under a condition of multi-domain path computation, the stateful PCE releasing the resources needed by the path notified by the first notification message comprises:
    releasing the resources needed by the path notified by the first notification message in the reserved or locked resources when a first notification message timer started after the stateful PCE receives the first notification message is due to expire.

10. The method according to claim 1, wherein the stateful PCE reserves or locks the resources needed by the computed path in a Traffic Engineering Database (TED).

11. The method according to claim 1, wherein the stateful PCE further saves a computation result when completing the path computation of the stateful PCE; the stateful PCE further deletes a computation result corresponding to a path using the released resources when releasing the resources.

12. A stateful Path Computation Element (PCE), comprising:
    a path computation module, which is configured to complete path computation of the stateful PCE;
    a resource processing module, which is configured to reserve or lock resources needed by a computed path;
    a receiving module, which is configured to receive a first notification message, wherein the first notification message is used for notifying the stateful PCE of a path which is unsuccessfully established during a Resource Reservation Protocol (RSVP) signalling procedure or a path which is successfully deleted during an RSVP signalling procedure; and
    a resource releasing module, which is configured to release the resources needed by the path notified by the first notification message;
wherein the stateful PCE is configured to, under a condition of multi-domain path computation, receive a second notification message for notifying an end-to-end path computation result before the stateful PCE receives the first notification message, and if the end-to-end path computation result indicates that the computation is unsuccessful, release the reserved or locked resources which correspond to the computation request when a second notification message timer, started after the stateful PCE receives the second notification message, is due to expire.

13. The method according to claim 2, wherein the stateful PCE further saves a computation result when completing the path computation of the stateful PCE; the stateful PCE further deletes a computation result corresponding to a path using the released resources when releasing the resources.

14. The method according to claim 5, wherein the stateful PCE further saves a computation result when completing the path computation of the stateful PCE; the stateful PCE further deletes a computation result corresponding to a path using the released resources when releasing the resources.

15. The method according to claim 7, wherein the stateful PCE further saves a computation result when completing the path computation of the stateful PCE; the stateful PCE further deletes a computation result corresponding to a path using the released resources when releasing the resources.

16. The method according to claim 9, wherein the stateful PCE further saves a computation result when completing the path computation of the stateful PCE; the stateful PCE further deletes a computation result corresponding to a path using the released resources when releasing the resources.

* * * * *